United States Patent [19]
Lewis

[11] Patent Number: 5,650,613
[45] Date of Patent: Jul. 22, 1997

[54] ENCODER FOR MEASURING, POSITION, VELOCITY AND ACCELERATION OF A SHAFT

[76] Inventor: W. Stan Lewis, 709 Mar Vista Dr., Vista, Calif. 92083

[21] Appl. No.: 488,781

[22] Filed: Jun. 8, 1995

[51] Int. Cl.$^6$ ........................................... G01D 5/34
[52] U.S. Cl. .......................... 250/231.18; 250/214 PR
[58] Field of Search .................. 250/231.13, 214 PR, 250/231.15, 231.18, 231.14, 237 R, 237 G

[56] References Cited

U.S. PATENT DOCUMENTS

| | | | |
|---|---|---|---|
| 3,128,386 | 4/1964 | Hughes | 250/231.13 |
| 3,824,878 | 7/1974 | Grosseau | 250/231.13 |
| 4,902,885 | 2/1990 | Kojima et al. | 250/214 PR |
| 5,030,825 | 7/1991 | Ikeuchi | 250/231.14 |

OTHER PUBLICATIONS

Sensors, Principles & Applications, Peter Hauptman Jan. 1991 pp. 34–48.
A. Dictionary of Symbols, Cirlot, Jan. 1971 pp. 48, 98, 246 & 247.
The Book of the Dragon, Allen et al., Jan. 1979 p. 10.

*Primary Examiner*—Que Le
*Attorney, Agent, or Firm*—Tom Hamill, Jr.

[57] ABSTRACT

An apparatus is disclosed for measuring rotation of a shaft with extreme precision. The apparatus includes a housing enclosing a slotted disk wherein the slot is continuously varying about the circumference of the disk. The housing is cylindrical and includes a tubular side portion intermediate a first and second circular face. The two circular faces and the slotted disk have a center. The shaft passes through the center of the two circular faces of the housing and the slotted disk. The slotted disk is fixed to rotate with the shaft. The housing includes a rotation means which permits the shaft to freely rotate in the housing. A first aperture is located outside the housing on the first circular face and a second aperture is located outside the housing on the second circular face, both first and second apertures being co-linear with the slot of the slotted disk and defining a channel. An emission source is located over the first aperture and an emission detector is located over the second aperture. As the shaft rotates, the slot attenuates the emission generated by the emission source. The emission detector detects this attenuated emission and generates a signal which may be processed to determine the rotational position, alignment, velocity and acceleration of the shaft in real time. Applications include industrial, navigation, aerospace, robotics and defense.

24 Claims, 9 Drawing Sheets

ENCODER FOR MEASURING, POSITION, VELOCITY AND ACCELERATION OF A SHAFT

BACKGROUND OF THE INVENTION

1. Field of the Invention

The present invention relates generally to devices which provide measurement of the rotation of a shaft, and more particularly, devices which provide real-time information concerning the instantaneous position, alignment, velocity and acceleration of a rotating shaft.

2. Description of the Prior Art

Devices which measure shaft position and rotation are known in the art. Principally, the optical shaft encoder has been utilized to measure such a shaft position or location. The optical shaft encoder includes a disk which has a plurality of apertures located in a radial fashion about the disk circumference. The disk is placed intermediate a light source, generally a diode, and a light detector. As the disk rotates, electric pulses are generated by the light detector which are measured and processed to determine shaft rotation.

Thus, while it is known to use disk devices to measure position, alignment and rotation of a shaft, the provision of employing a disk with a varying slot continuous about the circumference of the disk is not provided. No prior art discloses a sensor which includes a slotted disk element which attenuates an emission flux generated by an emission source. No prior art considers utilizing such a simple and cost effective device to measure position, alignment and rotation of shafts in general. Other advantages of the present invention over the prior art also will be rendered evident.

SUMMARY OF THE INVENTION

To achieve the foregoing and other advantages, the present invention, briefly described, provides a method and apparatus for measuring shaft position, alignment, rotation, velocity and acceleration. The instant invention determines these rotational parameters of a shaft by measuring the emission intensity of radiation passing through a disk with a continuously variable width slot circumscribed about the disk's circumference. The disk is attached to a shaft and rotates with the shaft. Emission detectors generate a signal based on the intensity of emission which passes through the slotted disk. The intensity response is then processed by appropriate means. Emission detectors are well known which provide linearity of response over several orders of magnitude of incident radiation intensity.

The shaft position, alignment, rotation, velocity and acceleration sensor, hereafter referred to as the sensor, includes a housing enclosing a slotted disk wherein a slot is continuously varying about the circumference of the disk. The housing is generally cylindrical and includes a tubular side portion intermediate a first and second circular face. The two circular faces and slotted disk have a center. The circular faces each have co-linear apertures. The first shaft passes through the center of the two circular faces of the housing and the slotted disk. The slotted disk is fixed to rotate with the shaft. The first circular face center includes means to permit free rotation of the shaft. The second circular face includes means to permit free rotation of the shaft. The aforementioned means to permit rotation may include a race of roller bearings, a bushing, an appropriately sized hole or other appropriate means. A first aperture is located outside the housing in the first circular face and a second aperture is located outside the housing in the second circular face, both first and second apertures being co-linear with the slot of the slotted disk and defining a channel. A collimated emission source is located over the first aperture and one or more collimated emission detectors are located over the second aperture. The collimators may include focusing optics to focus an image of the aperture or emission source on the detector. As the shaft rotates the slot attenuates the emission generated by the emission source. An emission detector detects this attenuated emission and generates a signal which may be processed to determine the instant rotational position, alignment, velocity and acceleration of the shaft in real time.

The slot which circumscribes the disk may best be described as an ouroboros previously described in U.S. patent application No. 08/297,850 (Notice of Allowance issued Apr. 17, 1995). The ouroboros is an archaic term applied to a tail biting dragon or serpent used to symbolize circumference or eternity. In the context of this disclosure it is used as a noun to describe the geometric shape produced by a right triangle by stretching the hypotenuse and opposite side at the apex of the angle which joins them in a circle. An apex so rotated then almost contacts the side opposite that apex at the base of the right angle. A similar construct can be made from any triangle or trapezium. The term ouroboros is used to describe the slot of continuously varying width of the slotted disk or cylinder of the instant invention and will be referred to as such below. The ouroboros shaped slot of variable width or ouroboric slot is illustrated in FIGS. 3 and 8 below.

To achieve the foregoing and other advantages, the present invention, briefly described, provides a low cost, simple apparatus to yield rotational and orientational information for a rotating shaft. The apparatus consists of a ouroboric slotted disk, said ouroboric slot constructed as described above from a triangle or trapezium, wherein the slot is continuously varying in width around the circumference of the disk. A fixed disk having a rectangular aperture extending along the radius line is intermediate a source emitter and the slotted disk. The aperture having length approximately the width of the slot and width approximately the distance between the maximum and minimum widths of the ouroboric slot. The slotted disk is intermediate the fixed disc having an aperture and one or more source detectors. The source detectors provide a response to the intensity of emission incident upon them. As the slotted disk rotates the linearly variable width of the slot linearly attenuates the source intensity relative to the source detectors. The absolute position of the disk is thus determinable from the intensity of the source received by the source detectors since the detectors response function is known a priori.

The observed detector intensity will vary smoothly and continuously from a maximum to zero as a function of angular position of the shaft when the plane of the ouroboric slot, during rotation, remains constantly orthogonal to the line through the co-linear apertures and the emission transmitted there through. The observed intensity response will thus be an indication of the position of the shaft as a function of either time or angle as the disk and shaft rotate.

Misalignment or wobble of the shaft is also determined. Since the shaft is fixed to the disk on which the ouroboric slot is circumscribed, out of plane motion or wobble of the shaft will be indicated as a variation of emission intensity striking the source detector as the apparent width of the ouroboric slot, between the source and detector, changes instantaneously due to wobble. This results in a discontinuity in the observed emission intensity as a result of this out of plane motion of the ouroboric slot.

Those skilled in the art will also recognize that the circumferential distance traveled of a disk or cylinder is readily obtained with extremely high precision.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a low cost apparatus which measures position, rotation, velocity, acceleration and alignment of a shaft in real-time.

It is therefore an object of the present invention to provide a apparatus which reports the instantaneous angular position of a shaft in real-time.

It is an object of the invention to employ a slotted disk or cylinder which may be easily attached or retro-fitted to a shaft intermediate an emission source and an emission detector.

It is an object of the invention to provide such a device having the capacity to measure minute differences of shaft position, alignment and rotation at extremely high precision relative to cost.

It is an object of the invention to provide such a device which will display minute variations in shaft wobble during rotation relative to cost.

It is an object of the present invention to measure with very high precision the circumferential distance traveled of a disk or cylinder.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a position, alignment and rotation sensor embodying the principles and concepts of the present invention will be described.

Figures 1, 1A:
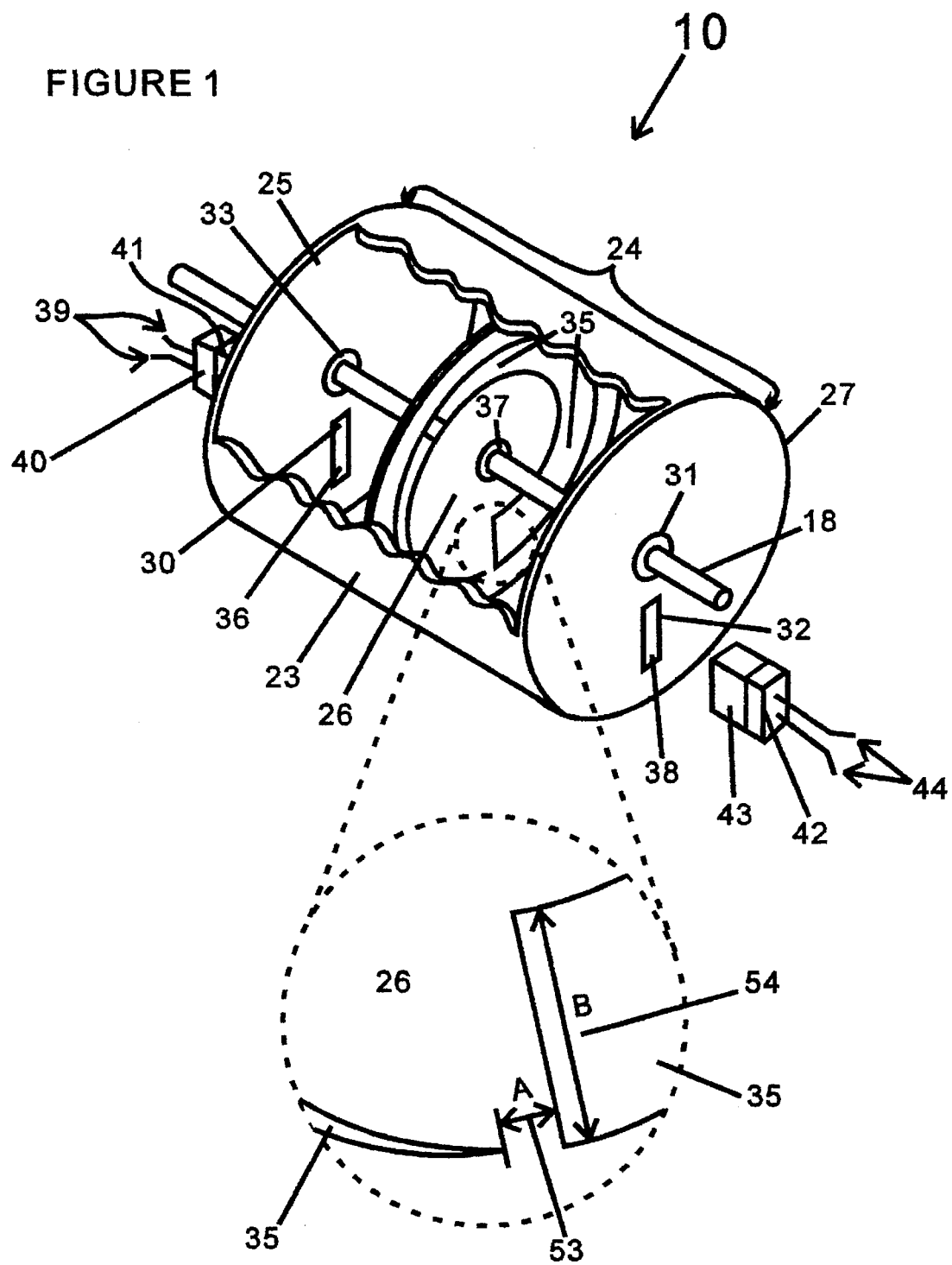
FIG. 1 is an exploded view of the preferred embodiment of the instant invention.
FIG. 1A is a spotlight view of the structure about the slot terminus of the slotted disk.
Figure 2:
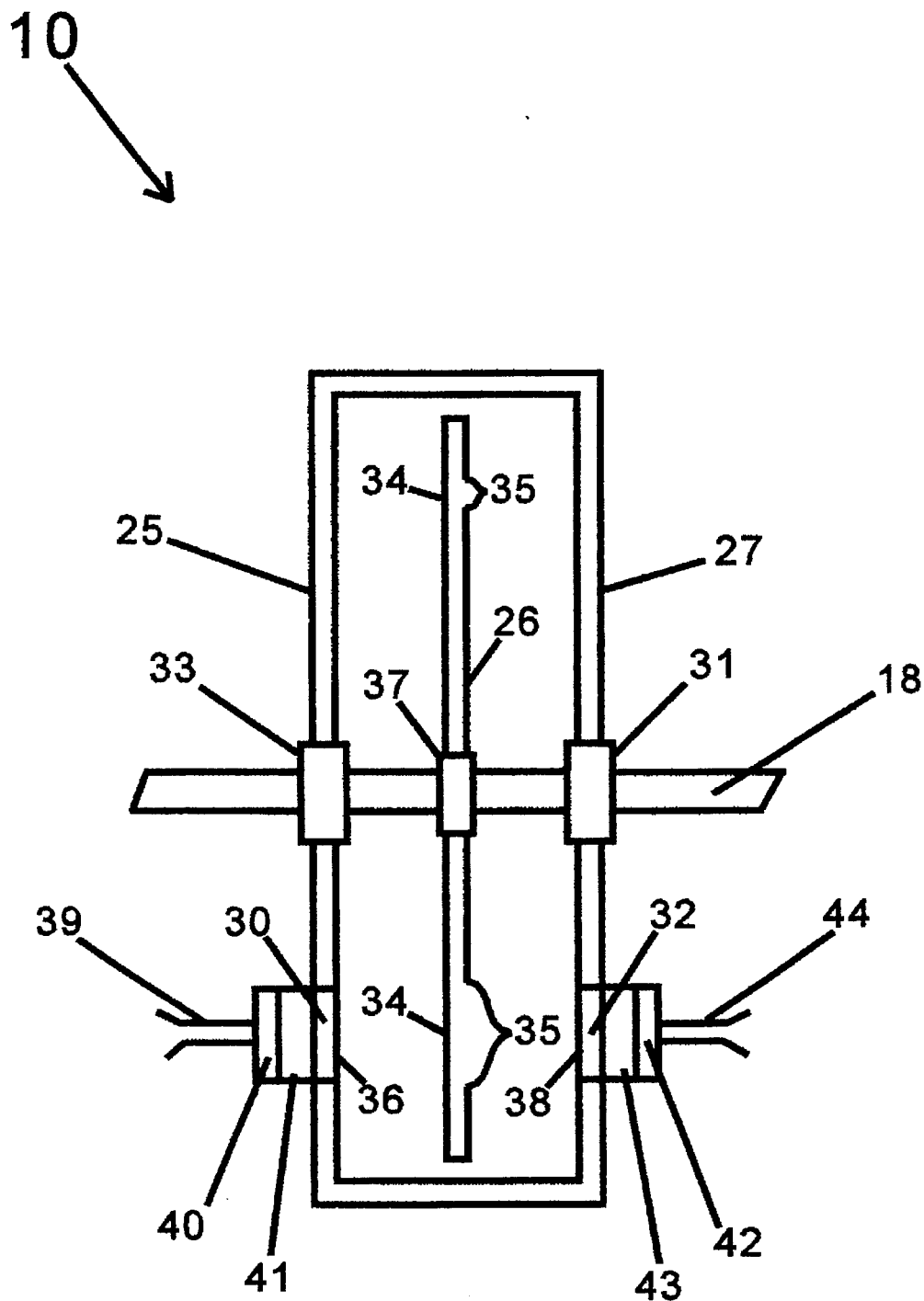
FIG. 2 is a side cut-away view through the rotation axis of the preferred embodiment of the instant invention.
Figure 3:
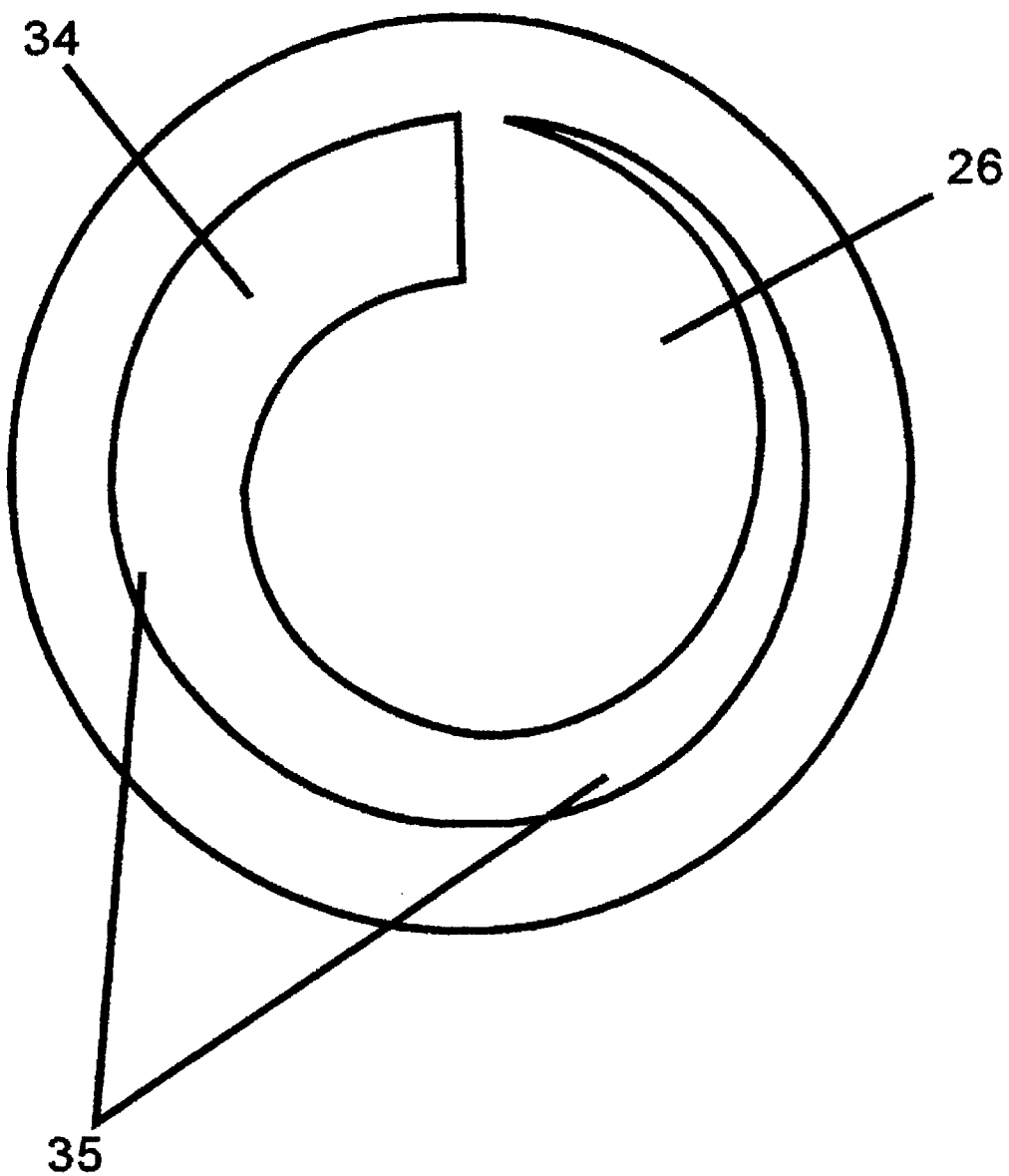
FIG. 3 is a plan view of the ouroboros circumscribed on a disk.

Turning initially to FIGS. 1–3, there is shown a first exemplary embodiment of the sensor device of the invention generally designated by reference numeral 10. In its preferred form, sensor device 10 comprises a sensor housing 24. The sensor housing 24 is generally cylindrical and encloses a slotted disk 26. The disk 26 is circular and shaft 18 passes through its center. Disk 26 is attached to shaft 18, disk 26 will rotate with shaft 18, and is balanced such that the center of mass of disk 26 is the geometric center. The sensor housing 24 as discussed is generally cylindrical. The sensor housing 24 includes a tubular side portion 23 intermediate a first circular face 25 and a second circular face 27, the tubular side portion 23 and the first and second circular faces 25 and 27 respectively, defining a cylinder. Shaft 18 passes through the center of the first circular face 25. A first shaft rotation means 33 is located at the center of the first circular face 25. A second shaft rotation means 31 is located at the center of the second circular face 27. The aforementioned first and second means to permit rotation, 33 and 31 respectively, may include, but is not limited to, a race of roller bearings, a bushing, an appropriately sized orifice or other appropriate rotation means. The sensor housing 24 may or may not be filled with a damping liquid, depending on the specific application. The liquid would be chosen to be transparent to radiation from the emission source. On the first circular face 25 is a first rectangular aperture 30. On the second circular face 27 is a second rectangular aperture 32. The first and second apertures, 30 and 32 respectively, are co-linear and fall on the same radius line from their common centers. As best seen in FIG. 1A, the width of each of the apertures 30 and 32 respectively are defined as being less than or equal to the distance between the minimum slot width and the maximum slot width. This width is shown in the at point 53 (designated A) in the spotlight view of FIG. 1A. The lengths of each aperture are defined as being greater than or equal to the maximum width of the slot. This maximum width being shown at the point 54 (designated B) in the spotlight view FIG. 1A.

The first aperture 30 and the second aperture 32 define an emission channel through the housing. The first aperture 30, the second aperture 32 may be covered with a first and second emission transparent fluid-impervious membrane, 36 and 38 respectively. Said membrane serving as a covering incorporated to inhibit fouling of the source and detector. Slot 35 may also be covered by an emission transparent, fluid-impervious membrane 34, this membrane incorporated to add stability and balance to disk 26. Intermediate the emission source 40 and the first aperture 30 is a first collimator 41. The emission source 40 has connection wires 39. An emission detector 42 having connection wires 44 is mounted over the second aperture 32. Intermediate the emission detector 42 and the second aperture 32 is a second collimator 43. The first collimator 41 and the second collimator 43 ensures that the emission is collimated and that no stray emission will be detected. The collimators 41 and 43 may incorporate focusing optics to focus an image of the aperture 32 which transmits emission intensity corresponding to the instantaneous position of slot 35 onto the emission detector 42.

Disk 26 has a slot 35 circumscribed about its circumference. The slot 35 has a width, the width has a maximum and a minimum, and the width varies continuously between those two values as one transits the circumference of the disk 26. No two points have the same width and the width diminishes at a constant rate as one transits the slot 35 from the maximum to the minimum. The minimum slot width is very small relative to the maximum and the slot 35 may be covered with a material 34 which is transparent to radiance from the emission source 40 to provide stability and balance to the disk. The maximum slot width is less than or equal to the length of the apertures, 30 and 32. The slot 35 is in the channel defined above, being fully intermediate the apertures, 30 and 32, and the emission source 40 and emission detector 42. The disk 26 rotates with shaft 18. The emission source 40 generates an emission which is detected by the emission detector 42. The emission source 40 may be any emission source known which has an emission. This includes, but is not limited to, a visible light source, a laser, a ionizing radiation source, an ultraviolet source, an infrared, a near infrared source or other source of electromagnetic radiation. Those skilled in the art will also recognize that a source of magnet flux may be used to indicate the disk position since the permittivity of the slot is different from the permittivity of the disk. This emission is attenuated by the slot 35 of disk 26. As the disk 26 rotates, the amount of emission which is attenuated varies as well. Therefore, the amount of emission detected by emission detector 42 is proportional directly to the disk 26 rotation. Emission detector 42 may be any emission detector known which generates an electrical signal which bears relation to the amount of emission incident upon it. This includes, but is not limited to, a charged couple device, photodiodes, cadmium sulfide or selenide detectors, radiation detectors, ultraviolet detectors, infrared or near infrared detectors, a visible light detectors or other detectors which provide an electrical response to electromagnetic radiation. When a source of magnetic flux is used as an emission source an appropriate detector, such as a Hall Effect device, will be used to measure the intensity of the flux. The emission source 40 and emission detector 42 will be chosen for the application and a detector will be chosen appropriate to the source. The electrical signal generated by the emission detector 42 will be processed by a microprocessor or other circuit to give real time information concerning the position, alignment, velocity, acceleration and rotation the shaft 18 is experiencing. This real time information may be displayed in an appropriate format for a user of the system, or employed in a control system.

Figure 4:
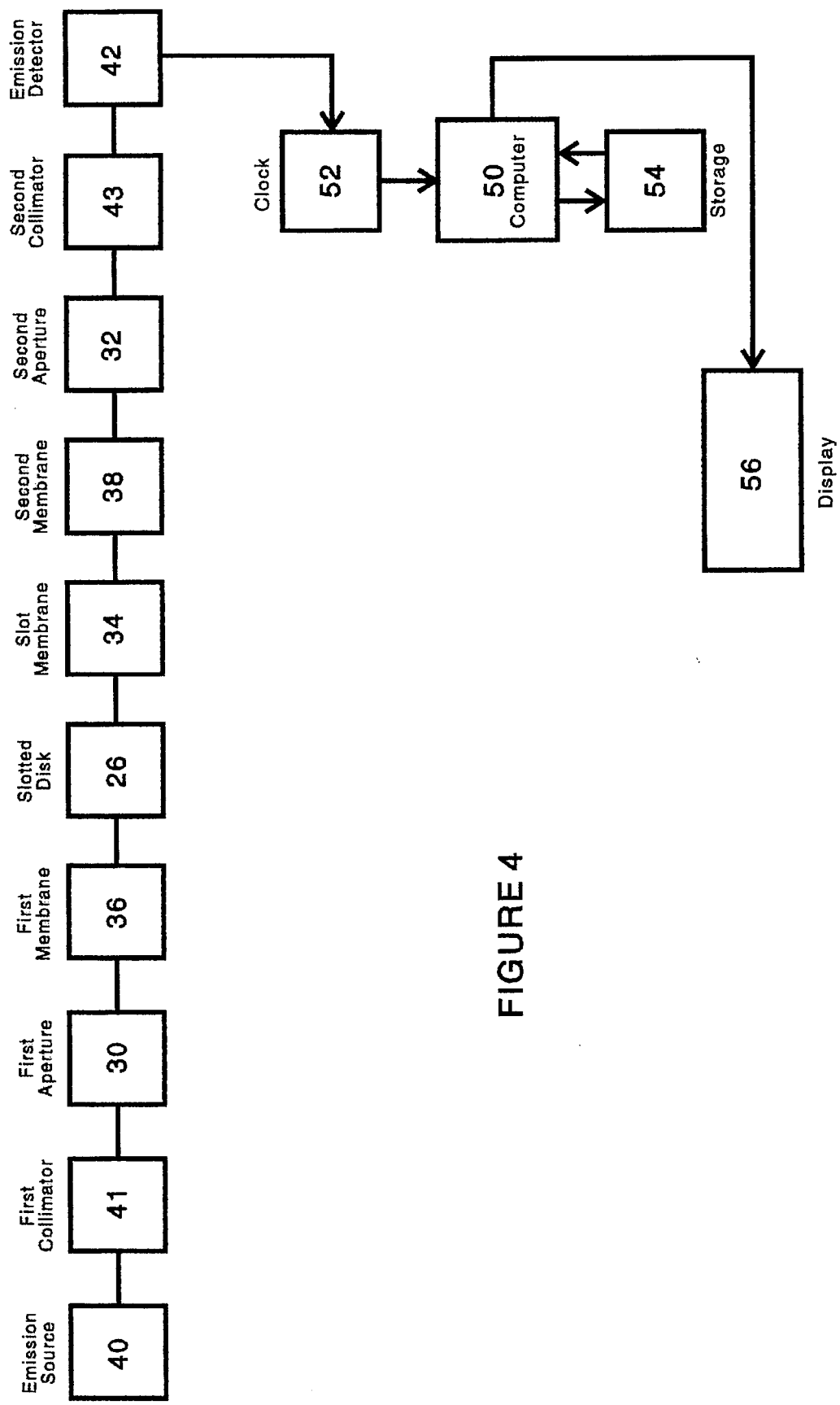
FIG. 4 is a block diagram describing the emission path and logic employed to determine shaft position, alignment, velocity, acceleration and rotation.

Referring now specifically to FIG. 4, a block diagram is provided. Emission source 40 provides an emission. This emission will vary depending on the emission source utilized. It is to be understood that any known or presently unknown emission source may be employed. This emission passes through a first collimator 41 and through the first aperture 30 and first membrane 36. After the first aperture 30 the emission travels until it contacts slotted disk 26, with slot membrane 34. Slotted disk 26 will attenuate the emission depending on the position, alignment and rotation of the shaft 18 that the sensor 10 is mounted to. This now attenuated emission passes through the slot membrane 34, the second membrane 38 and the second aperture 32 and into a second collimator 43. The emission then falls incident upon an emission detector Emission detector 42 generates a signal which relates to the amount of emission incident upon it. It is to be understood that any known or presently unknown emission detector may be employed. Emission detector 42 is selected such that it may detect the attenuated emission emanating from the emission source.

Emission detector 42 generates a signal which is passed to a processing means 50. The processing means may be a computer, processing circuit, microprocessor or other processing means. A clock 52 also provides a signal to the processing means 52. The clock 52 will permit time related calculations to be performed. Storage 54 may be provided to store time related values. The processing means 50 gives an output signal to an output means 56. Output means 56 may be a digital display. The display face may display real time shaft position, rotational velocity, rotational acceleration or rotational alignment.

DESCRIPTION OF THE ALTERNATE EMBODIMENT

Figure 5A:
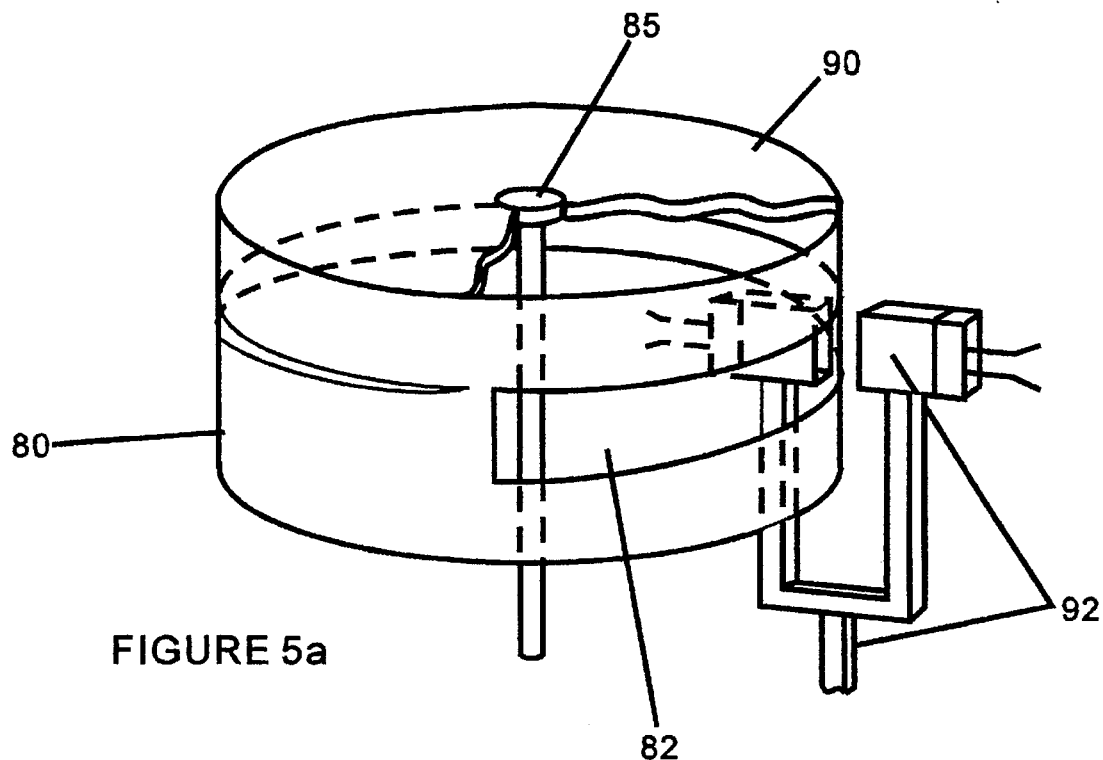
FIG. 5A is an illustration of an alternate embodiment of the invention wherein the ouroboros is circumscribed about the walls of a cylinder.
Figure 5B:
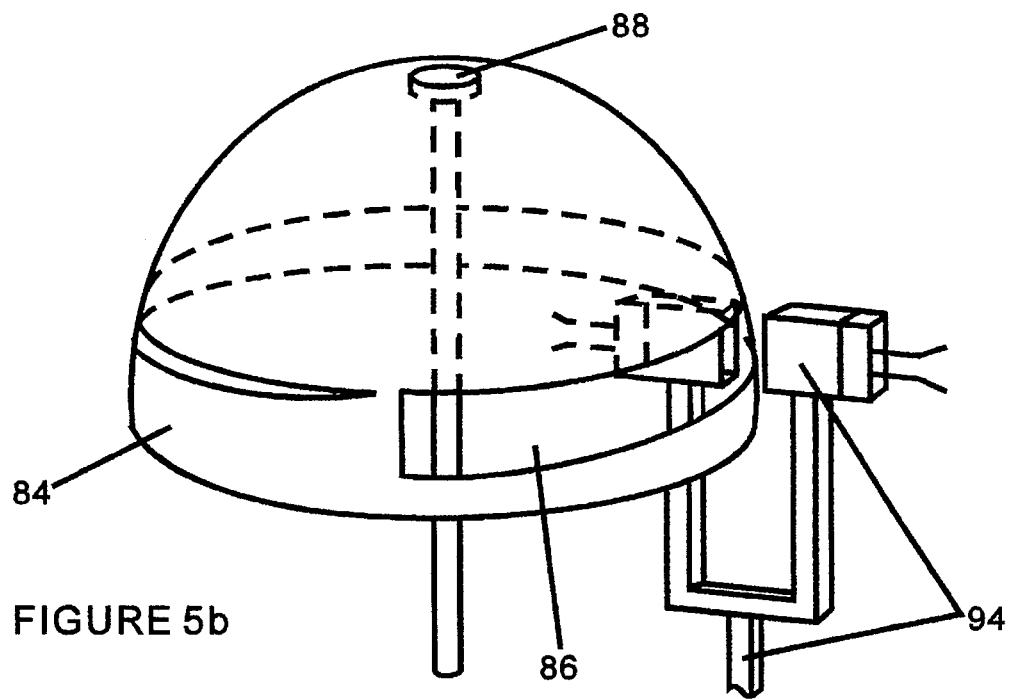
FIG. 5B is an illustration of yet another alternate embodiment of the invention wherein the ouroboros is circumscribed about the walls of a semisphere.
Figure 6:
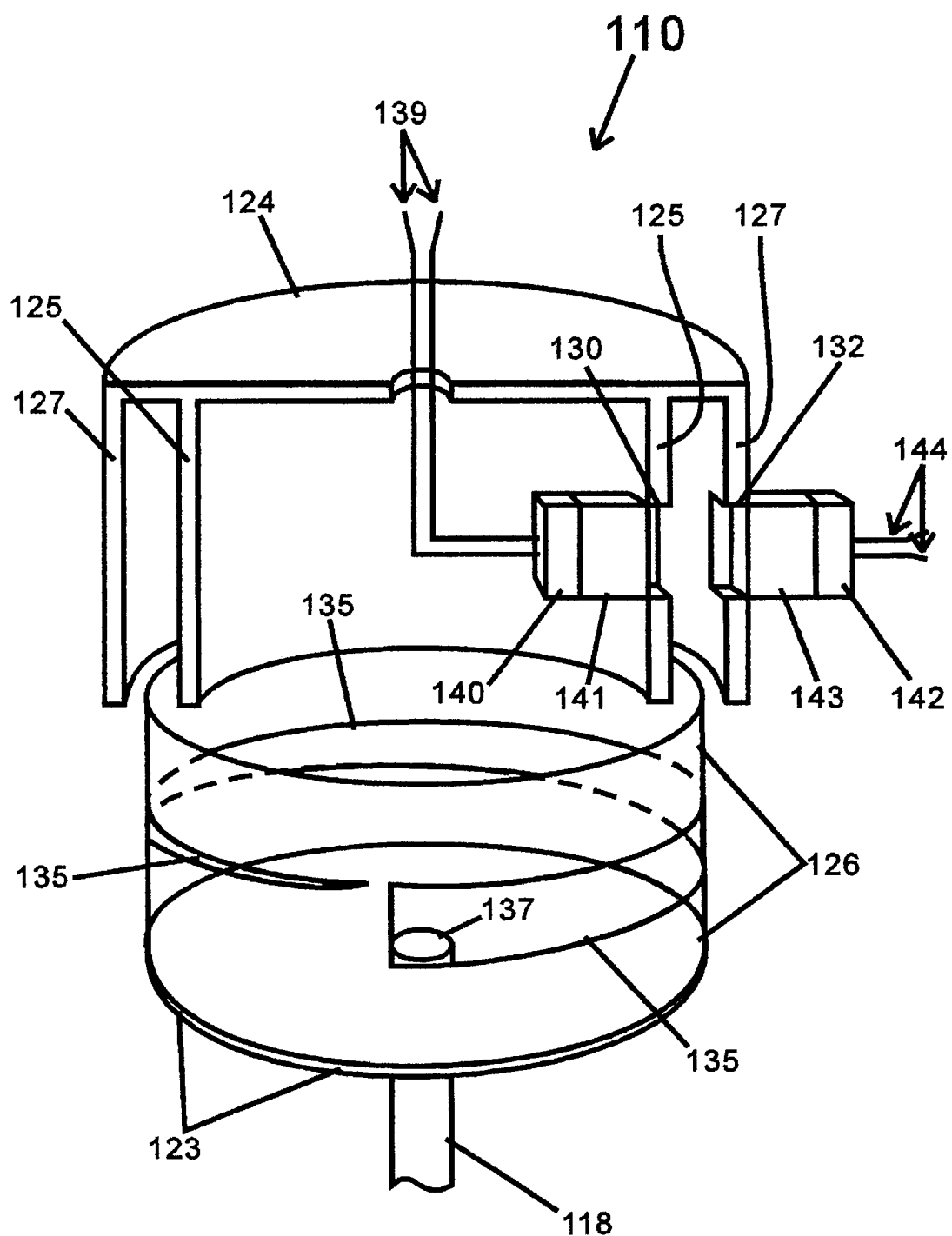
FIG. 6 is an exploded view of an alternate embodiment of the instant invention.

FIG. 5A and 5B provides an illustration of alternate embodiments wherein ouroboros shaped slots are wrapped about the surface of a cylinder and a semisphere. Referring now specifically to FIG. 5A a cylindrical element 80 is provided. The cylindrical element 80 is hollow. An ouroboros shaped slot 82 is provided through the cylindrical element 80. It is envisioned the slot 82 will be placed intermediate an emission source and an emission detector 92 as provided in the primary embodiment of the invention. The cylindrical element 80 will be mounted for rotation at position 85 in the center of circular face 9. The cylindrical element 80 is balanced such that the center of mass is the geometric center 85. Assembly 92 is a "Y" shaped assembly which incorporates (on either side) an emission source, emission detector, apertures and collimators as described in the primary embodiment of the invention. As the cylindrical element 80 rotates specific rotational parameters may be ascertained per previous discussions.

Referring now specifically to FIG. 5B a hemispherical or semispherical element 84 is provided. Element 84 is provided to be hollow, that is, with a thin surface. An ouroboros shaped slot 86 is provided through the semispherical element 84 which is mounted for rotation about its center 88. It is envisioned the slot 86 will be placed intermediate an emission source and an emission detector 94 as provided in the primary embodiment of the invention. The cylindrical element 84 is balanced such that the center of mass is the geometric center 88. Assembly 94 is a "Y" shaped assembly which incorporates (in either symmetry) an emission source, emission detector, apertures and collimators as described in the primary embodiment of the invention. As the element 84 rotates specific rotational parameters may be ascertained per previous discussions.

There are many different geometrical configurations which would support an ouroboric slot being cut therethrough which may function essentially as the disk 26, cylinder 80 or hemisphere 84 described here in. Concentric cylindrical sleeves rather than adjacent disks may be used to secure the source and detectors and provide apertures, as if topologically extruding the primary embodiment by 90° through the rotation axis to form cylinders equivalent to the disks described above. The processing logic is identical to that of the disk embodiment. This is described herein as a primary alternate embodiment.

Turning now to FIGS. 6–9, there is shown an alternate embodiment of the sensor device of the invention generally designated by reference numeral 110. In this alternate form, sensor device 110 comprises a sensor housing 124. The sensor housing 124 encloses a slotted cylinder 126. The cylinder 126 has a circular base plate affixed, 123, and shaft 118 is fixed to the center, 137, of base plate 123. Cylinder 126 with base plate 123 are attached to shaft 118, cylinder 126 will rotate with shaft 118, and is balanced such that the center of mass of cylinder 126 is the geometric center. The sensor housing 124 as discussed is generally circular and remains fixed whilst cylinder 126 rotates with shaft 118. The sensor housing 124 includes a perpendicular cylindrical portion 125 concentric with a second perpendicular cylindrical portion 127. The cylindrical portion 127, the second cylindrical portion 126 upon which is circumscribed the ouroboric slot 135, and the third cylindrical portion 125, respectively, define a set of concentric cylinders. Cylindrical portion 126 and subsequently ouroboric slot 135 rotate as shaft 118 rotates. Cylindrical portions 125 and 127 attached to housing 124 remain fixed relative to said rotation.

On the first cylinder 125 is a first rectangular aperture 130. On the second cylinder 127 is a second rectangular aperture 132. The first and second apertures, 130 and 132 respectively, are co-linear and fall on the same radius line from their common centers. The relationship between apertures 130 and 132 and ouroboric slot 135 are as illustrated in FIG. 1A, the primary embodiment.

Figure 7:
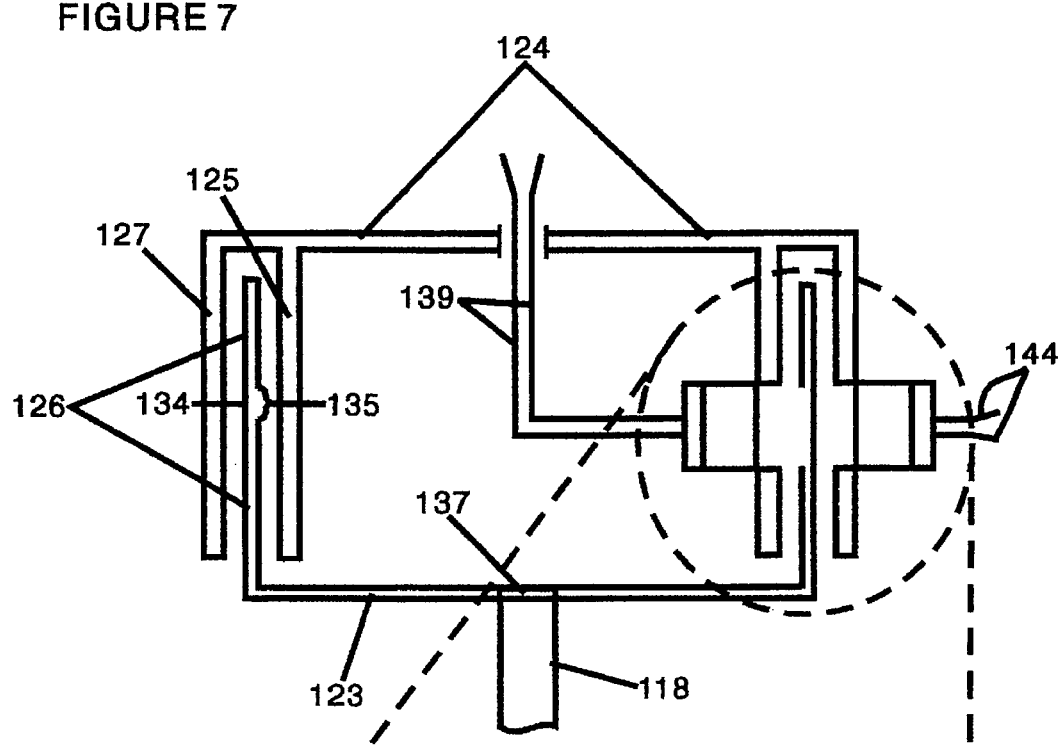
FIG. 7 is a side cut-away through the rotation axis of an alternate embodiment of the instant invention.
Figure 7A:
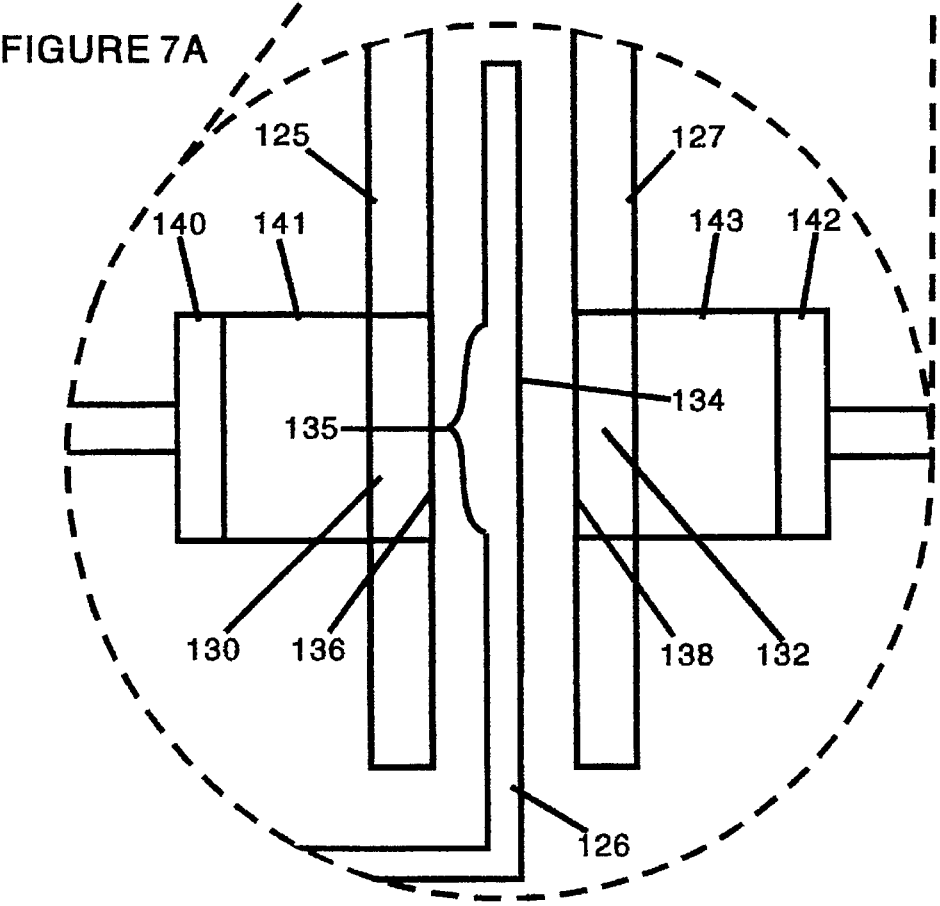
FIG. 7A is a spotlight view of the structure about the source and detector locations.
Figure 8:
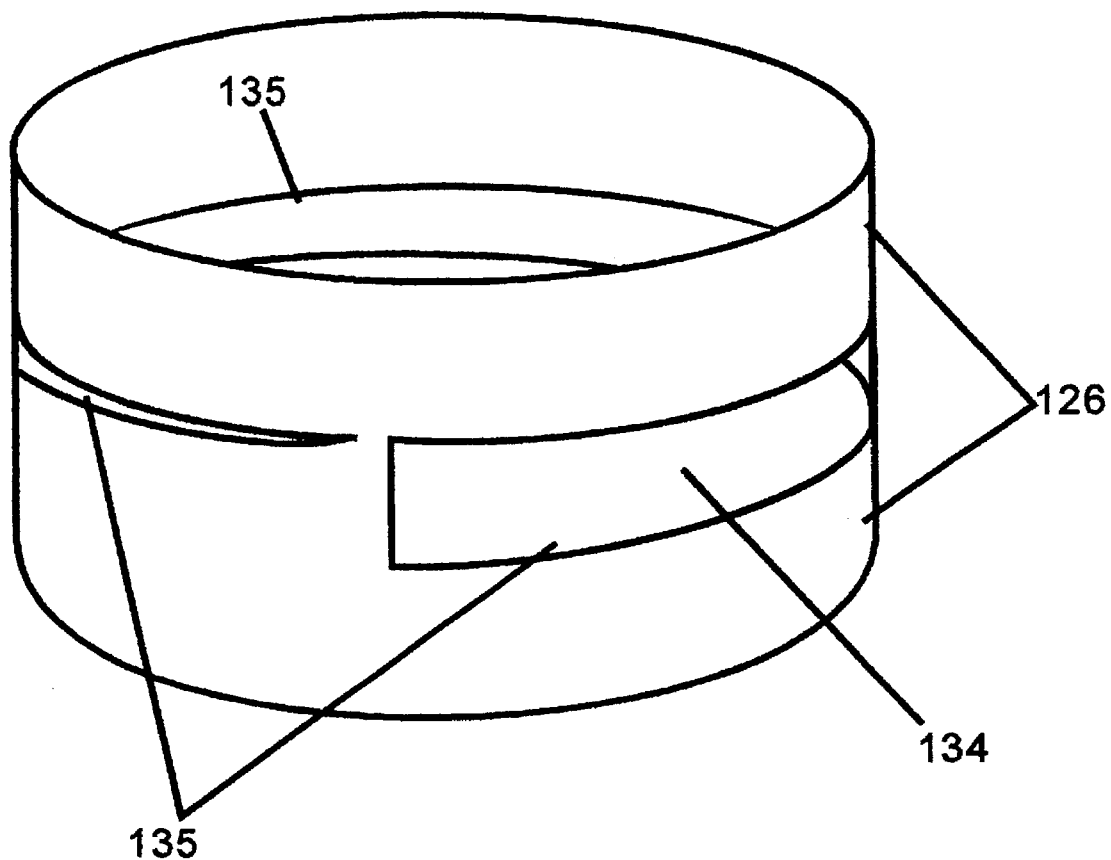
FIG. 8 is a plan view of the ouroboros circumscribed about a cylindrical section.

The first aperture 130 and the second aperture 132 define an emission channel through the housing. The first aperture 130, the second aperture 132 may be covered with a first and second emission transparent fluid-impervious membrane, 136 and 138 respectively. Said membrane serving as a covering incorporated to inhibit fouling of the source and detector. Slot 135 may also be covered by an emission transparent, fluid-impervious membrane 134 (FIG. 8), this membrane incorporated to add stability and balance to cylinder 126. Intermediate the emission source 140 and the first aperture 130 is a first collimator 141. The emission source 140 has connection wires 139. An emission detector 142 having connection wires 144 is mounted over the second aperture 132. Intermediate the emission detector 142 and the second aperture 132 is a second collimator 143. The first collimator 141 and the second collimator 143 ensures that the emission is collimated and that no stray emission will be detected. The collimators 141 and 143 may incorporate focusing optics to focus an image of the aperture. 132 which transmits emission intensity corresponding to the instantaneous position of slot 135 onto the emission detector 142. FIG. 7A is a spotlight view of the region about the emission source and detectors.

Cylinder 126 has a slot 135 circumscribed about its circumference. The slot 135 has a width, the width has a maximum and a minimum, and the width varies continuously between those two values as one transits the circumference of the cylinder 126. No two points have the same width and the width diminishes at a constant rate as one transits the slot 135 from the maximum to the minimum. The minimum slot width is very small relative to the maximum and the slot 135 may be covered with a material 134 which is transparent to radiance from the emission source 140 to provide stability and balance to the disk. The maximum slot width is less than or equal to the length of the apertures, 130 and 132. The slot 135 is in the channel defined above, being fully intermediate the apertures, 130 and 132, and the emission source 140 and emission detector 142. The cylinder 126 rotates with shaft 118. The emission source 140 generates an emission which is detected by the emission detector 142. The emission source 140 may be any emission source known which has an emission. This includes, but is not limited to, a visible light source, a laser, a ionizing radiation source, an ultraviolet source, an infrared, a near infrared source or other source of electromagnetic radiation. Those skilled in the art will also recognize that a source of magnet flux may be used to indicate the disk position since the permittivity of the slot is different from the permittivity of the disk. This emission is attenuated by the slot 135 of cylinder 126. As the cylinder 126 rotates, the amount of emission which is attenuated varies as well. Therefore, the amount of emission detected by emission detector 142 is proportional directly to the disk 126 rotation. Emission detector 142 may be any emission detector known which generates an electrical signal which bears relation to the amount of emission incident upon it. This includes, but is not limited to, a charged couple device, photodiodes, cadmium sulfide or selenide detectors, radiation detectors, ultraviolet detectors, infrared or near infrared detectors, a visible light detectors or other detectors which provide an electrical response to electromagnetic radiation. When a source of magnetic flux is used as an emission source an appropriate detector, such as a Hall Effect device, will be used to measure the intensity of the flux. The emission source 140 and emission detector 142 will be chosen for the application and a detector will be chosen appropriate to the source. The electrical signal generated by the emission detector 142 will be processed by a microprocessor or other circuit to give real time information concerning the position, rotation, velocity, acceleration and alignment the shaft 118 is experiencing. This real time information may be displayed in an appropriate format for a user of the system, or employed in a control system.

Figure 9:
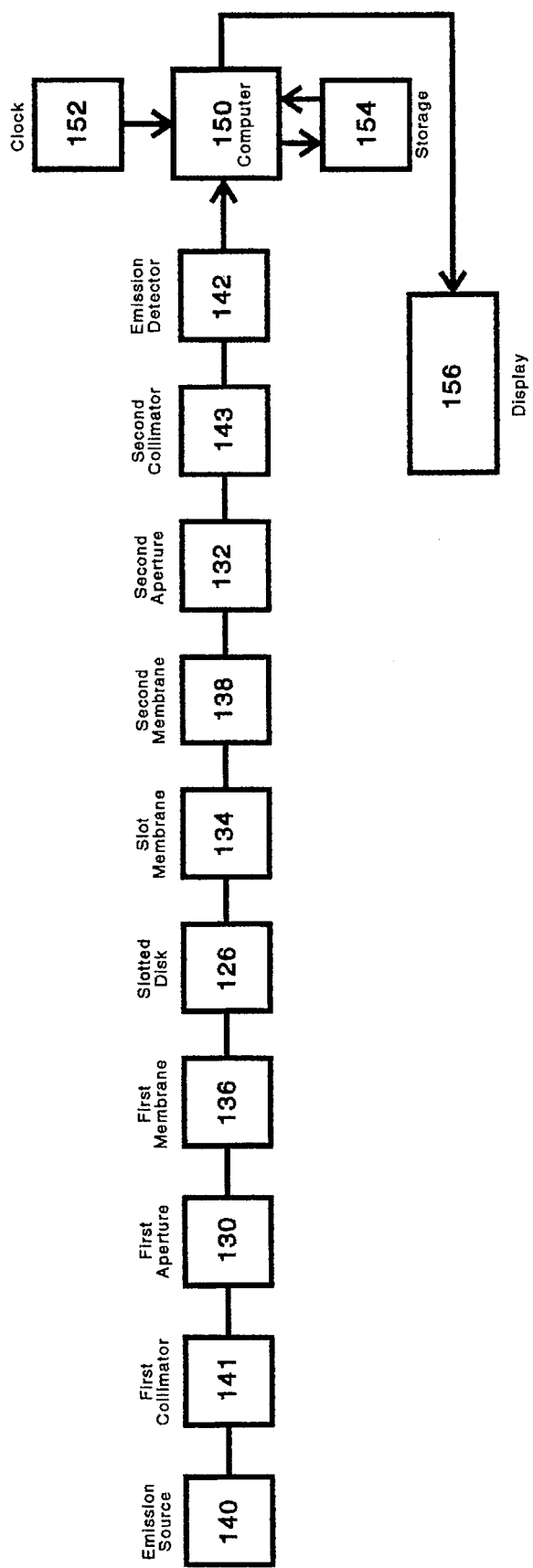
FIG. 9 is a block diagram describing the emission path and logic employed to determine shaft position, alignment, velocity, acceleration and rotation of the alternate embodiment.

FIG. 9, the block diagram provided, illustrates the logical principals employed herein identical to those in FIG. 4, the primary embodiment. Emission source 140 provides an emission. This emission will vary depending on the emission source utilized. It is to be understood that any known or presently unknown emission source may be employed. This emission passes through a first collimator 141 and through the first aperture 130 and first membrane 136. After the first aperture 130 the emission travels until it contacts slotted disk 126. Ouroboric slot 135 on disk 126 will attenuate the emission depending on the position, alignment and rotation of the shaft 118 that the sensor 110 is mounted to. This now attenuated emission passes through the slot membrane 134, the second membrane 138 and the second aperture 132 and into a second collimator 143. The emission then falls incident upon an emission detector 142. Emission detector 142 generates a signal which relates to the amount of emission incident upon it. It is to be understood that any known or presently unknown emission detector may be employed. Emission detector 142 is selected such that it may detect the attenuated emission emanating from the emission source. Signal processing is illustrated in FIG. 9, and is identical to that in FIG. 4.

Although most envisioned applications of this sensor device center about the first and second embodiment, as best described in FIGS. 1–9 above, other applications employing slotted members with varying slot width which attenuates an emission are possible and are to be included in the scope of this discourse.

It is apparent from the above that the present invention accomplishes all of the objectives set forth by providing an apparatus which provides extremely accurate and precise values concerning the position, alignment, rotational velocity and acceleration of a shaft.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. An apparatus for determining the position and rotation of a shaft comprising:
    a housing, said housing including a first aperture and a second aperture, said first aperture co-linear to said second aperture and forming an emission channel,
    a disk, said disk located intermediate said first aperture and said second aperture,
    said disk further including a slot, said slot proximal to the circumference of said disk and defining a passage through said disk, said passage having a width, said width varying about the circumference of said disk,
    attachment means, said attachment means located at the center of said disk, said attachment means for securing said disk to the shaft,
    said slot aligned with said channel,
    an emission source, said emission source located atop said first aperture, an emission detector, said emission detector located atop said second aperture.

2. An apparatus as claimed in claim 1 wherein said emission source generates an emission and said passage permits a portion of said emission to pass therethrough, said portion being dependent on the position of said disk, said portion being detected by said emission detector, said emission detector generating a signal.

3. An apparatus as claimed in claim 2 including signal processing means, said signal processing means including a clock, whereby said signal may be processed into recognizable output concerning the position and velocity of said shaft.

4. An apparatus as claimed in claim 3 wherein said housing includes a first face element and a second face element, said first aperture located on said first face element, and said second aperture located on said second face element.

5. An apparatus as claimed in claim 4 wherein said first face element and said second face element has a center, said first face element center includes a first rotation means, said second face element center includes a second rotation means, said first and second rotation means further being co-linear.

6. An apparatus as claimed in claim 5 wherein the shaft passes through said first rotation means and said second rotation means, the shaft being able to rotate freely within said first and second rotation means.

7. An apparatus comprising:
    an emission source and an emission detector, said emission source generating an emission,
    attenuation means, said attenuation means located intermediate said emission source and said emission detector, said attenuation means being a circular disk including a slot therethrough, said slot being proximal to the perimeter of said disk, said slot further having a continuously variable width between a minimum and a maximum, said slot attenuating said emission by allowing a portion of said emission to pass therethrough,
    a discontinuity, said discontinuity being intermediate said minimum and said maximum, said discontinuity causing an absence of emission,
    whereby said portion is detected by said emission detector, and said emission detector generates a signal proportional to said portion, and said absence of emission generates a signal.

8. The apparatus as claimed in claim 7 wherein said attenuation means is movable with respect to said emission source and said emission detector.

9. A sensor device which generates a signal comprising:
    a thin wall element intermediate an emission source and an emission detector, said emission source generating an emission,
    said thin wall element including a slot,
    said slot having a first end and a second end, said slot having a width, said width continuously varying between said first end and said second end, said slot allowing a portion of said emission to pass therethrough, whereby said thin wall element undergoes displacement with respect to said emission source and emission detector, and said emission detector generates a signal based on the intensity of said portion, said signal being proportional to the position and the velocity of said thin wall element.

10. The sensor device as claimed in claim 9 wherein said thin walled element is a hollow semisphere.

11. The sensor device as claimed in claim 9 including signal processing means, said signal processing means permitting said signal to be formed into a recognizable output.

12. The sensor device as claimed in claim 11 including a clock means generating a time signal.

13. The sensor device as claimed in claim 12 including data storage means, whereby said signal may be stored with said time signal to provide a record of said displacement over time.

14. The sensor device as claimed in claim 9 wherein said thin walled element is a disk.

15. The sensor device as claimed in claim 9 wherein said thin walled element is a hollow cylinder.

16. An apparatus for determining the position and rotation of a shaft comprising:

a first cylindrical wall, a second cylindrical wall, said second cylindrical wall concentrically located within said first cylindrical wall, a first aperture, said first aperture located on said first cylindrical wall, a second aperture, said second aperture located on said second cylindrical wall, said first aperture being collinear to said second aperture, a gap, said gap located between said first cylindrical wall and said second cylindrical wall, an emission detector, said emission detector located proximal to said first aperture, an emission source, said emission source located proximal to said second aperture, said emission source generating a emission, a third cylindrical wall, said third cylindrical wall being freely rotatable and secured to a shaft member by a securing means, said third cylindrical wall nested concentrically intermediate said first cylindrical wall and said second cylindrical wall at said gap, and said third cylindrical wall having a slot located thereon, said slot defining a passage through said third cylindrical wall, said passage having a width, said width varying about said third cylindrical wall whereby, said emission is attenuated by said slot.

17. An apparatus as claimed in claim 16 wherein and said passage permits a portion of said emission to pass therethrough, said portion being dependent on the position of said third cylindrical wall, said portion being detected by said emission detector, said emission detector generating a signal.

18. An apparatus as claimed in claim 17 including signal processing means, said signal processing means including a clock, whereby said signal may be processed into recognizable output concerning the position and velocity of said shaft.

19. An apparatus as claimed in claim 18 wherein said slot has a first end and a second end.

20. An apparatus as claimed in claim 19 wherein said slot has a continuously vary width, said width having a maximum at said first end, and said width having a minimum at said second end.

21. An apparatus as claimed in claim 18 wherein said signal processing means further includes a computer.

22. An apparatus as claimed in claim 18 wherein said signal processing means further includes a microprocessor.

23. An apparatus as claimed in claim 18 including collimation means located intermediate said emission source and said emission detector.

24. An apparatus as claimed in claim 23 wherein a transparent membrane covers said first aperture and said second aperture.

* * * * *